(12) United States Patent
Kaushik et al.

(10) Patent No.: US 8,019,953 B2
(45) Date of Patent: Sep. 13, 2011

(54) METHOD FOR PROVIDING ATOMICITY FOR HOST WRITE INPUT/OUTPUTS (I/OS) IN A CONTINUOUS DATA PROTECTION (CDP)-ENABLED VOLUME USING INTENT LOG

(75) Inventors: Shyam Kaushik, Bangalore (IN); William P. Delaney, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 601 days.

(21) Appl. No.: 12/217,201

(22) Filed: Jul. 1, 2008

(65) Prior Publication Data

US 2010/0005255 A1 Jan. 7, 2010

(51) Int. Cl.
*G06F 12/00* (2006.01)
*G06F 12/02* (2006.01)

(52) U.S. Cl. ............... 711/156; 711/114; 711/E12.001; 714/54

(58) Field of Classification Search .......... 711/156, 711/114, E12.001; 714/54
See application file for complete search history.

(56) References Cited

U.S. PATENT DOCUMENTS

2007/0300013 A1* 12/2007 Kitamura .................. 711/114

* cited by examiner

*Primary Examiner* — Yong Choe
(74) *Attorney, Agent, or Firm* — Suiter Swantz pc llo

(57) ABSTRACT

The present invention is a method for providing atomicity for host write Input/Outputs (I/Os) in a Continuous Data Protection (CDP)-enabled volume. When a host overwrite Input/Output (I/O) is initiated by a host against a data block of the CDP-enabled volume, the method may include creating an in-flight write log entry and providing the in-flight write log entry to an in-flight write log of the CDP-enabled volume. The in-flight write log entry may correspond to the host overwrite I/O. The method may further include locating mapping table information in a mapping table of the CDP-enabled volume. The mapping table information may correspond to the data block. The method may further include recording a journal entry in a journal of the CDP-enabled volume. The journal entry may include a journal entry timestamp which corresponds to the host overwrite I/O. The method may further include allocating a storage location for the host overwrite I/O.

11 Claims, 5 Drawing Sheets

METHOD FOR PROVIDING ATOMICITY FOR HOST WRITE INPUT/OUTPUTS (I/OS) IN A CONTINUOUS DATA PROTECTION (CDP)-ENABLED VOLUME USING INTENT LOG

FIELD OF THE INVENTION

The present invention relates to the field of electronic data storage and particularly, to a method for providing atomicity for host write Input/Outputs (I/Os) in a Continuous Data Protection (CDP)-enabled volume using an intent log.

BACKGROUND OF THE INVENTION

Currently available storage controllers, such as those which host Redundant Array of Inexpensive Disks (RAID) volumes, may not provide a desired level of performance, particularly when large write I/Os are performed by a host against said RAID volumes. For example, when an instance (including the host and the storage array controller) fails during the write I/O process, the aforementioned less than desired level of performance of currently available storage controllers may make recovery of host applications difficult.

Therefore, it may be desirable to provide a solution which addresses and/or obviates the problems associated with the currently available solutions.

SUMMARY OF THE INVENTION

Accordingly, an embodiment of the present invention is directed to a method for providing atomicity for host write I/Os in a Continuous Data Protection (CDP)-enabled volume, including: when a host overwrite Input/Output (I/O) is initiated by a host against a data block of the CDP-enabled volume, creating an in-flight write log entry and providing the in-flight write log entry to an in-flight write log of the CDP-enabled volume, said in-flight write log entry corresponding to the host overwrite I/O; locating mapping table information in a mapping table of the CDP-enabled volume, said mapping table information corresponding to the data block; recording a journal entry in a journal of the CDP-enabled volume, said journal entry corresponding to the host overwrite I/O, said journal entry including a journal entry timestamp, said journal entry timestamp corresponding to the host overwrite I/O; and allocating a storage location for the host overwrite I/O.

A further embodiment of the present invention is directed to a method for providing atomicity for host write I/Os in a CDP-enabled volume, including: when a host overwrite Input/Output (I/O) is initiated by a host against a data block of the CDP-enabled volume, creating an in-flight write log entry and providing the in-flight write log entry to an in-flight write log of the CDP-enabled volume, said in-flight write log entry corresponding to the host overwrite I/O; locating mapping table information in a mapping table of the CDP-enabled volume, said mapping table information corresponding to the data block; recording a journal entry in a journal of the CDP-enabled volume, said journal entry corresponding to the host overwrite I/O, said journal entry including a journal entry timestamp, said journal entry timestamp corresponding to the host overwrite I/O; and allocating a storage location for the host overwrite I/O.

An additional embodiment of the present invention is directed to a computer-readable medium having computer-executable instructions for performing a method for providing atomicity for host write I/Os in a CDP-enabled volume, including: when a host overwrite Input/Output (I/O) is initiated by a host against a data block of the CDP-enabled volume, creating an in-flight write log entry and providing the in-flight write log entry to an in-flight write log of the CDP-enabled volume, said in-flight write log entry corresponding to the host overwrite I/O; locating mapping table information in a mapping table of the CDP-enabled volume, said mapping table information corresponding to the data block; recording a journal entry in a journal of the CDP-enabled volume, said journal entry corresponding to the host overwrite I/O, said journal entry including a journal entry timestamp, said journal entry timestamp corresponding to the host overwrite I/O; allocating a storage location for the host overwrite I/O; and linking the journal entry corresponding to the host overwrite I/O to a previous journal entry via a CDP link, said previous journal entry corresponding to a previously initiated host write I/O.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
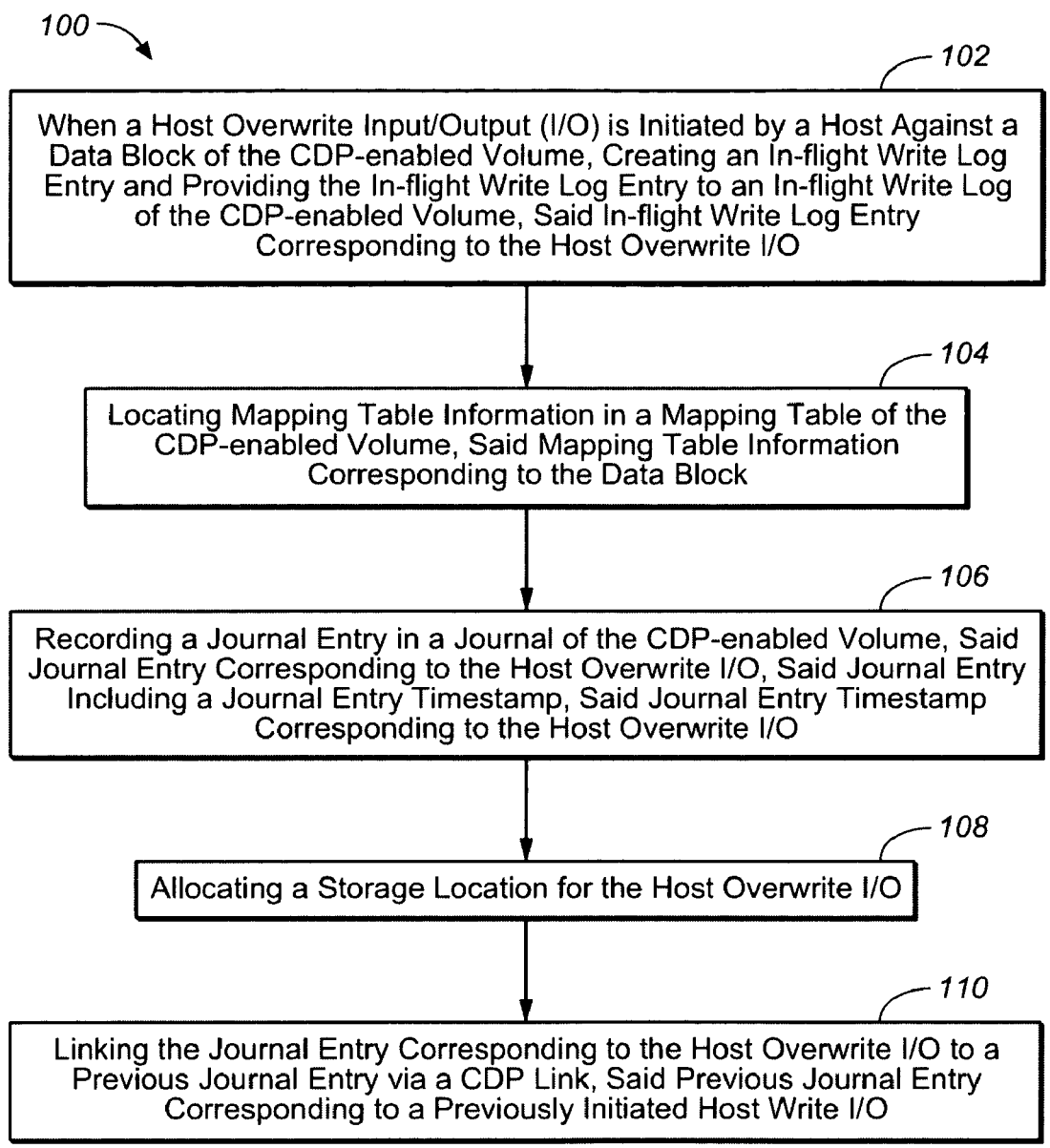
FIG. 1 is a flow chart illustrating a method for providing atomicity for host write I/Os in a CDP-enabled volume in accordance with an exemplary embodiment of the present invention.

Reference will now be made in detail to the presently preferred embodiments of the invention, examples of which are illustrated in the accompanying drawings.

Currently available host systems/servers/operating systems may be configured to perform a large write input/output (I/O) against Redundant Array of Inexpensive Disks (RAID) volumes which are hosted by storage array controllers. However, currently available storage array controllers may have a limited amount of cache memory and may sometimes be unable to hold/store an entire large write I/O in the cache memory. Therefore, a currently available storage array controller may break up/separate/segment a large host write I/O into fractional write I/Os/fractional data/data fractions within the storage array controller. For example, a currently available storage array controller, in response to a large host write I/O may perform the following process/steps: Step 1—allocate a fractional amount of the cache memory of the storage array controller/cache memory; Step 2—transfer fractional data from the host to the cache memory; Step 3—flush the fractional data from the cache memory to the physical disks (ex.—the physical disks of a RAID array); Step 4—repeat Step 1 until all data corresponding to the large host write I/O is received and flushed to the physical disks; Step 5—send status to the host.

The above-referenced process, which may be performed by a currently available storage array controller, may have drawbacks in that, if the whole instance/system (ex.—including the host and the storage array controller) fails during the process, then the physical disks may be left/may contain partial data that is valid. For instance, the physical disk(s) may include/contain partial data that corresponds to the new large host write I/O (ex.—the above-described large host write I/O which was in progress during the system failure) and may further include or contain partial data that corresponds to data/is data which was previously included/contained on the physical disk(s). Consequently, this partial data dilemma may make recovery of host applications very difficult. To address this host application recovery problem, host applications may need to be configured with/may need to include complicated logics. In extreme instances, user intervention may be required. The above-referenced scenario/dilemma/problem arises or is a problem because of said currently available storage controllers' failure to guarantee atomicity for host write I/O operations.

Continuous Data Protection (CDP) is a data protection technique which is becoming prevalent in the storage industry. A true CDP solution tracks every host write I/O along with its time stamp by using journals/a set of journals for data and metadata. Such a solution may make it possible for a user to recover a state of a volume to a previous point in time. Associated software may go through the set of journals to determine the state of the volume (along with determining data of/included in the volume) at a previous point in time.

The method of the present invention may implement or enable a volume, such as a thin provisioned volume, with CDP. Further, the method of the present invention may address the above-referenced problems associated with current solutions by applying an automatic rollback of a volume state in/for each CDP-enabled volume by maintaining an in-flight write log (ex.—an intent log) for each CDP-enabled volume, which may provide, to a host, a volume which has atomic characteristics/atomicity for write I/Os. As an exemplary definition, atomicity may be defined as follows: a property of database transactions which are guaranteed to either completely occur, or have no effects.

Figure 2:
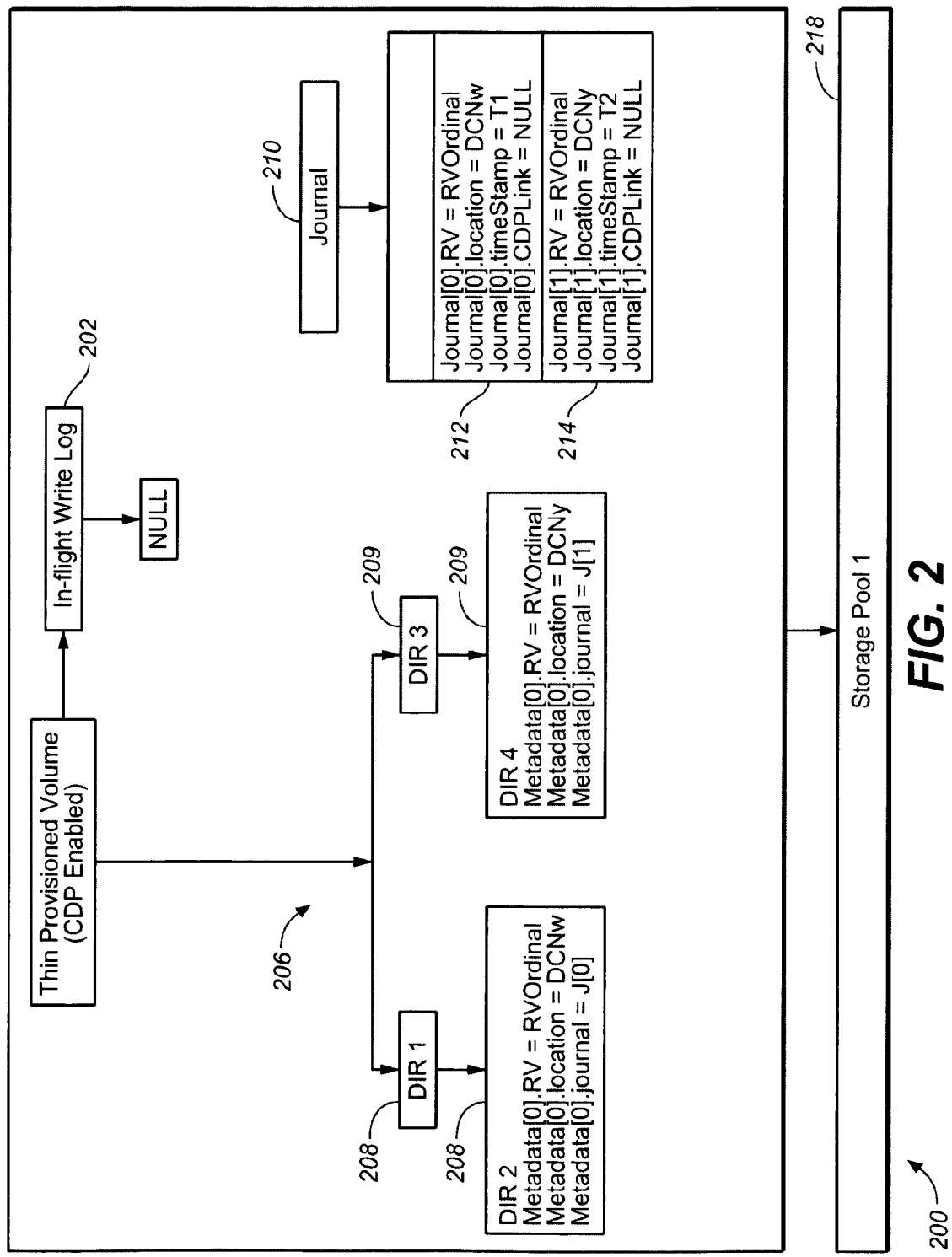
FIG. 2 is a block diagram schematic illustrating a state of a thin provisioned, CDP-enable volume at a first point in time in accordance with an exemplary embodiment of the present invention.
Figure 3:
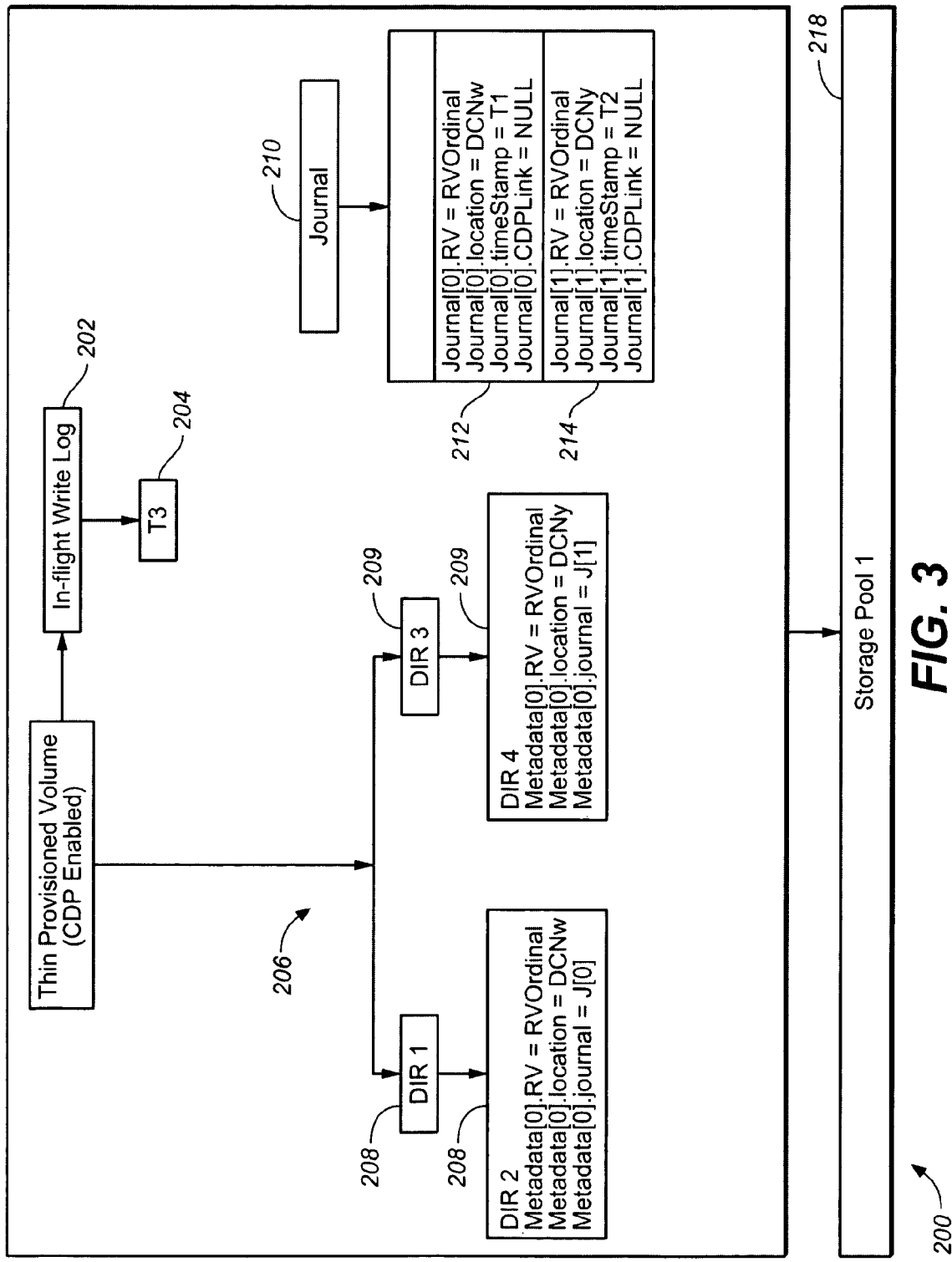
FIG. 3 is a block diagram schematic illustrating a state of a thin provisioned, CDP-enable volume at a second point in time in accordance with a further exemplary embodiment of the present invention.

FIG. 1 illustrates a method for providing atomicity for host write I/Os in a CDP-enabled volume in accordance with an exemplary embodiment of the invention. The method 100 may include, when a host overwrite Input/Output (I/O) is initiated by a host against a data block of the CDP-enabled volume, creating an in-flight write log entry and providing the in-flight write log entry to an in-flight write log of the CDP-enabled volume 102. For instance, FIG. 2 illustrates a state of the CDP-enabled volume 200 (ex.—a thin provisioned volume) at a first point in time. Said first point in time may be just prior to initiation of the host overwrite I/O. In exemplary embodiments, the CDP-enabled volume 200 may include an in-flight write log 202 (ex.—an intent log). Further, at said first point in time illustrated in FIG. 2, the in-flight write log may be empty/may have no entries. (as shown by the designation "NULL"). As mentioned above, when a host overwrite I/O is initiated by the host against a data block of the CDP-enabled volume, an in-flight write log entry 204 is created and provided to the in-flight write log 202. For example, said in-flight write log entry 204 may be/may include an in-flight write log entry timestamp (ex.—"T3" as shown in FIG. 3). which may correspond to the host overwrite I/O/may indicate a time at which the host overwrite I/O was initiated/began executing, or the like. FIG. 3 illustrates a state of the CDP-enabled volume 200 at a second point in time, said second point in time being after said host overwrite I/O has been initiated against the data block (ex.—Logical Block Address (LBA X) and after said in-flight write log entry 204 (ex.—T3) has been created and provided to the in-flight write log 202. In exemplary embodiments, the in-flight write log entry 204 may correspond to the host overwrite I/O.

In additional embodiments of the present invention, the method 100 may further include locating mapping table information in a mapping table of the CDP-enabled volume, said mapping table information corresponding to the data block 104. In exemplary embodiments, the CDP-enabled volume 200 may include a mapping table 206 which may include information corresponding to the data block. For example, said mapping table may be indexed based on host Logical Block Addressing (LBA). Further, said mapping table 206 may include one or more mapping table entries (208, 209). For example, the mapping table entries (208, 209) may correspond to previously initiated/executed host I/Os for the CDP-enabled volume 200. (FIG. 2 illustrates the state of the CDP-enabled volume after having had 2 write I/Os performed to it). Still further, the mapping table entries (208, 209) may point to real volume coordinates (ex.—RAID volume ordinal, DCN (Disk Cluster Number)) and to journal entries of the CDP-enabled volume 200 which track metadata. The metadata may track timestamp(s) of host write(s) and may also track the real volume coordinates.

In current embodiments of the present invention, the method 100 may further include recording a journal entry in a journal of the CDP-enabled volume, said journal entry corresponding to the host overwrite I/O, said journal entry including a journal entry timestamp, said journal entry timestamp corresponding to the host overwrite I/O 106. In exemplary embodiments, the CDP-enabled volume 200 may include a journal 210. In further embodiments, said journal 210 may include one or more journal entries (see reference numerals 212, 214, 216 of FIG. 4). As mentioned above, one of the one or more journal entries (ex.—216) may correspond to the host overwrite I/O. Further, the journal entry corresponding to the host overwrite I/O 216 may also include a journal entry timestamp corresponding to the host overwrite I/O (ex.—Journal[2].timeStamp=T3). In additional embodiments, the method 100 may further include allocating a storage location (ex.—cluster) for the host overwrite I/O 108. For instance, the storage location may be allocated from a storage pool 218 of the CDP-enabled volume 200/communicatively coupled with the CDP-enabled volume 200.

Figure 4:
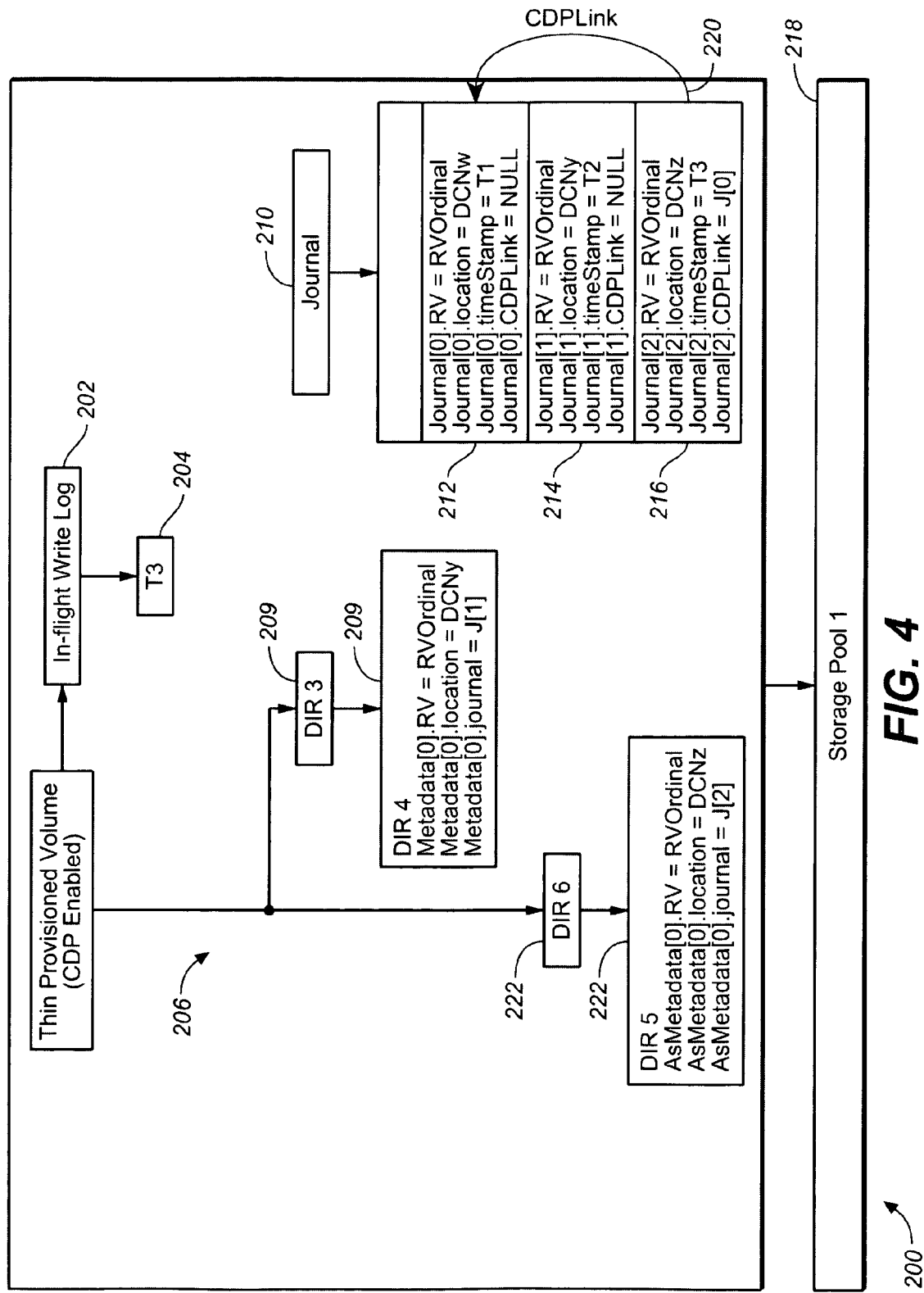
FIG. 4 is a block diagram schematic illustrating a state of a thin provisioned, CDP-enable volume at a third point in time in accordance with a further exemplary embodiment of the present invention.

In exemplary embodiments of the present invention, the method 100 may further include linking the journal entry corresponding to the host overwrite I/O to a previous journal entry 110. For example, the journal entry (and metadata) corresponding to the host overwrite I/O (ex.—216) may be linked to/associated to a previous journal entry (ex.—212), via a CDP link 220, as shown in FIG. 4. The previous journal entry 212 may correspond to a previously initiated host write I/O.

In additional embodiments, the method 100 may further include creating a mapping table entry/entries corresponding to the host overwrite I/O and providing said mapping table entry corresponding to the host overwrite I/O to the mapping table 112. For instance, a mapping table entry corresponding to the host overwrite I/O 222 may be added to the mapping table 206. In further embodiments, the method 100 may further include removing a previous mapping table entry/entries from the mapping table 114. For example, a mapping table entry associated with/corresponding to a previously initiated/executed host write I/O (such as mapping table entry 208, 209) may be removed from the mapping table 206. In exemplary embodiments, a previously initiated/executed host write I/O may be a host write I/O which was completed/performed/executed to the CDP-enabled volume 200 prior to the host overwrite I/O being initiated to the CDP-enabled volume 200. FIG. 4, which illustrates a state of the CDP-enabled volume 200 at a third point in time, depicts the mapping table 206 as having been updated, such that the mapping table entry corresponding to the host overwrite I/O 222 has been added (ex.—the mapping table 206 has been updated with the newly allocated data block/storage location) and a mapping table entry corresponding to a previous host write I/O 208 has been removed (ex.—cleanup of old mapping table entry/entries has been triggered).

In current embodiments of the present invention, the method 100 may further include executing the host overwrite I/O to the allocated storage location 116 (ex.—to the newly allocated region). The method 100 may further include, when execution of the host overwrite I/O is/has completed, clearing the in-flight write log entry from the in-flight write log and providing a response to the host, said response signaling that execution of the host overwrite I/O is completed 118. For instance, the in-flight write log entry 204 (ex.—T3) may be cleared from the in-flight write log 202 once the host overwrite I/O is completely processed and said response is about to be sent to the host.

Alternatively, when an instance failure/system failure (ex.—host and storage array controller failure) occurs during execution of the host overwrite I/O and when a host read I/O is subsequently initiated against the data block after instance recovery, the method 100 may further include locating in the mapping table said mapping table entry corresponding to the host overwrite I/O 120. (ex.—mapping table entry 222). In additional embodiments, the method 100 may further include locating the journal entry corresponding to the host overwrite I/O 122. (ex.—journal entry 216). The method 100 may further include checking the in-flight write log to determine if said in-flight write log includes an in-flight write log timestamp that matches the journal entry timestamp corresponding to the host overwrite I/O 124. For example, checking the in-flight write log 202 may reveal that the in-flight write log includes an in-flight write log entry 204/an in-flight write log timestamp that corresponds to the host overwrite I/O (ex.—T3) and which matches (ex.—is the same as, or corresponds to) the journal entry 216/journal entry timestamp corresponding to the host overwrite I/O (ex.—Journal[2].timeStamp=T3). In cases in which said instance failure occurs, the presence in the in-flight write log 202 of the in-flight write log timestamp corresponding to the host write I/O may indicate that said host overwrite I/O may not have completed/may not have been completely processed (since said in-flight write log timestamp has not been cleared from the in-flight write log 202, such as via step 118 above). Further, this may indicate that partial data associated with the host overwrite I/O (ex.—invalid data) may be present on/in the data block to which the host overwrite I/O was initiated and that said data block may need to be reconstructed.

In further embodiments, when the in-flight write log includes an in-flight write log timestamp that matches the journal entry timestamp corresponding to the host overwrite I/O, the method 100 may further include accessing said previous journal entry corresponding to said previously initiated host write I/O via said CDP link 126. The method 100 may further include restoring said previous mapping table entry corresponding to the previously initiated host write I/O to said mapping table 128. For instance, by implementing the method 100 of the present invention, the data block to which the host overwrite I/O was initiated may be reconstructed/the state of the CDP-enabled volume 200 may be rolled back to a previous state (ex.—a state prior to the instance failure and prior to initiation of the host overwrite I/O) by: using the CDP link 220 to access said previous journal entry 212 corresponding to said previously initiated host write I/O (and corresponding to previous valid data for the data block); and by restoring said previous mapping table entry 208 to the mapping table 206. This functionality may allow the CDP-enabled volume 200 to have atomic characteristics/atomicity for write I/Os.

Figure 5:
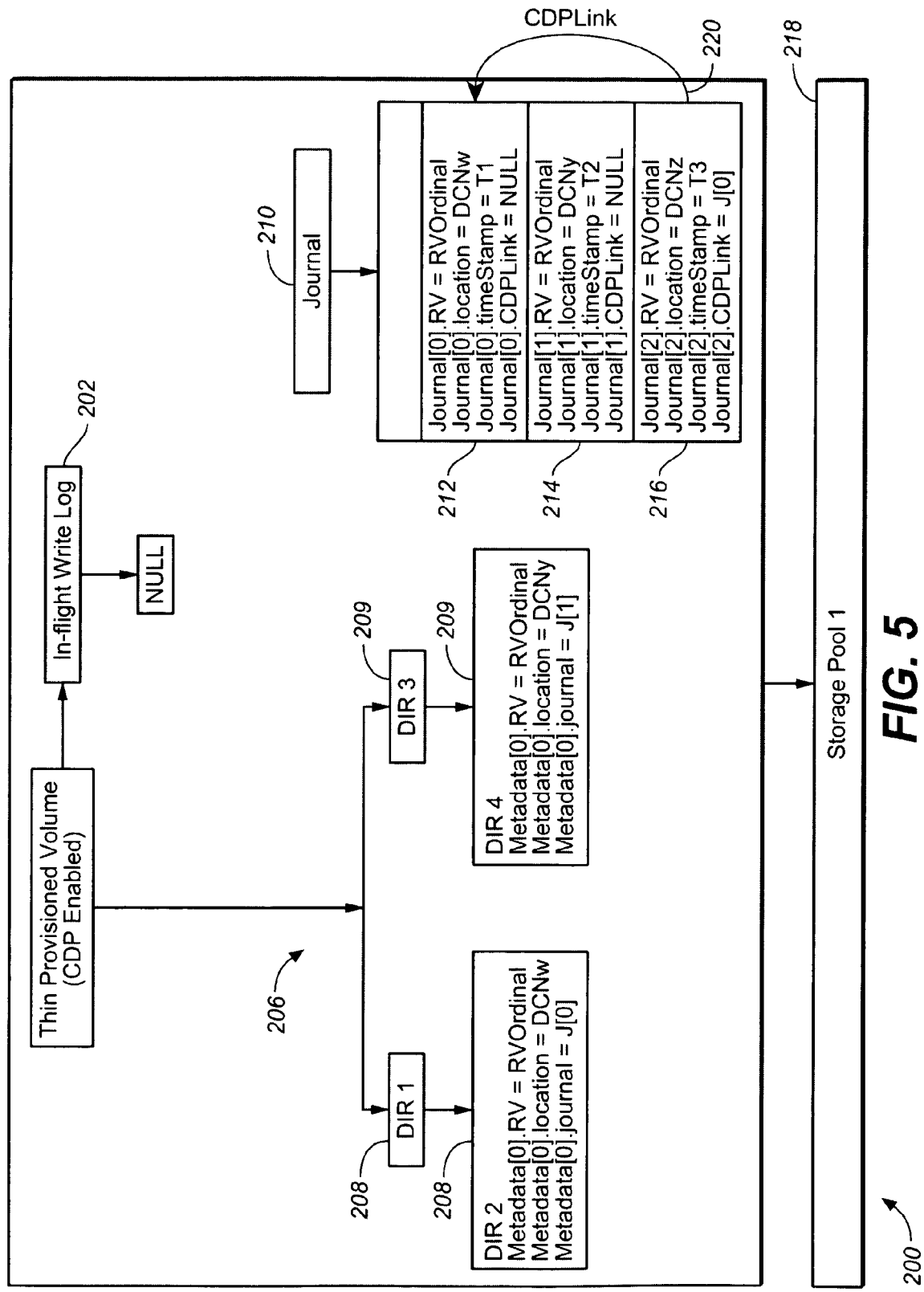
FIG. 5 is a block diagram schematic illustrating a state of a thin provisioned, CDP-enable volume at a fourth point in time in accordance with a further exemplary embodiment of the present invention.

In exemplary embodiments, the method 100 may further include removing said mapping table entry corresponding to the host overwrite I/O from the mapping table 130. The method 100 may further include clearing the in-flight write log entry and the in-flight write log timestamp (ex.—the in-flight write log entry/in-flight write log timestamp corresponding to the host overwrite I/O) from the in-flight write log 132. For example, once the data block to which the host overwrite I/O was initiated has been reconstructed by accessing the previous journal entry 212 via the CDP link 220 (and thereby accessing previous valid data for the data block), the state of the CDP-enabled volume 200 may essentially be rolled back to a previous state (ex.—a state prior to initiation of the host overwrite I/O and prior to instance failure) by updating the mapping table (to the previous state as shown in FIG. 5) and clearing the in-flight write log entry 204/in-flight write log timestamp corresponding to the host overwrite I/O from the in-flight write log 202.

In additional embodiments, the method 100 may further include executing the host read I/O 134. The method 100 may further include, when execution of the host read I/O is completed, providing a response to the host signaling that execution of the host read I/O is completed 136.

The above-described method of the present invention allows for/applies an automatic rollback of volume state for the CDP-enabled volume 200 by maintaining/tracking the in-flight write log 202, thereby providing to the host a volume which has atomic characteristics for write I/Os. Further, the method of the present invention may be utilized/performed with various CDP-enabled volumes/CDP implementations. Still further, if a system failure occurs with in-flight writes in progress, the method of the present invention may be implemented to automatically roll back the state of the CDP-enabled volume to a previous sane state. It is to be noted that one or more of the above-referenced method steps may be performed by a disk array controller/storage array controller/storage controller of/for the volume 200. In exemplary embodiments, the storage controller may be a hardware/hardware-based storage controller. In further embodiments, the storage controller may be a software/software-based/operating system-based storage controller. In still further embodiments, the storage controller may be a firmware/driver-based storage controller.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A non-transitory computer-readable medium having computer-executable instructions for performing a method for providing atomicity for host write Input/Outputs (I/Os) in a Continuous Data Protection (CDP)-enabled volume, said method comprising:
    when a host overwrite Input/Output (I/O) is initiated by a host against a data block of the CDP-enabled volume, creating an in-flight write log entry and providing the in-flight write log entry to an in-flight write log of the CDP-enabled volume, said in-flight write log entry corresponding to the host overwrite I/O;
    locating mapping table information in a mapping table of the CDP-enabled volume, said mapping table information corresponding to the data block;
    recording a journal entry in a journal of the CDP-enabled volume, said journal entry corresponding to the host overwrite I/O, said journal entry including a journal entry timestamp, said journal entry timestamp corresponding to the host overwrite I/O;
    allocating a storage location for the host overwrite I/O; and
    linking the journal entry corresponding to the host overwrite I/O to a previous journal entry via a CDP link, said previous journal entry corresponding to a previously initiated host write I/O.

2. A non-transitory computer-readable medium as claimed in claim 1, said method further comprising:
    creating a mapping table entry corresponding to the host overwrite I/O and providing said mapping table entry corresponding to the host overwrite I/O to the mapping table;
    removing a previous mapping table entry from the mapping table, said previous mapping table entry corresponding to the previously initiated host write I/O; and
    executing the host overwrite I/O to the allocated storage location.

3. A non-transitory computer-readable medium as claimed in claim 2, said method further comprising:
    when execution of the host overwrite I/O is completed, clearing the in-flight write log entry from the in-flight write log and providing a response to the host signaling that execution of the host overwrite I/O is completed.

4. A non-transitory computer-readable medium as claimed in claim 2, said method further comprising:
    when an instance failure occurs during execution of the host overwrite I/O and when a host read I/O is subsequently initiated against the data block after instance recovery, locating in the mapping table said mapping table entry corresponding to the host overwrite I/O.

5. A non-transitory computer-readable medium as claimed in claim 4, said method further comprising:
    locating the journal entry corresponding to the host overwrite I/O;
    checking the in-flight write log to determine if said in-flight write log includes an in-flight write log timestamp that matches the journal entry timestamp corresponding to the host overwrite I/O;
    when the in-flight write log includes an in-flight write log timestamp that matches the journal entry timestamp corresponding to the host overwrite I/O, accessing said previous journal entry corresponding to said previously initiated host write I/O via said CDP link;
    restoring said previous mapping table entry corresponding to the previously initiated host write I/O to said mapping table;
    removing said mapping table entry corresponding to the host overwrite I/O from the mapping table; and
    clearing the in-flight write log entry and the in-flight write log timestamp from the in-flight write log.

6. A non-transitory computer-readable medium as claimed in claim 5, said method further comprising:
    executing the host read I/O; and
    when execution of the host read I/O is completed, providing a response to the host signaling that execution of the host read I/O is completed.

7. A method for providing atomicity for host write Input/Outputs (I/Os) in a Continuous Data Protection (CDP)-enabled volume, comprising:
    when a host overwrite Input/Output (I/O) is initiated by a host against a data block of the CDP-enabled volume, creating an in-flight write log entry and providing the in-flight write log entry to an in-flight write log of the CDP-enabled volume, said in-flight write log entry corresponding to the host overwrite I/O;
    locating mapping table information in a mapping table of the CDP-enabled volume, said mapping table information corresponding to the data block;
    recording a journal entry in a journal of the CDP-enabled volume, said journal entry corresponding to the host overwrite I/O, said journal entry including a journal entry timestamp, said journal entry timestamp corresponding to the host overwrite I/O;
    allocating a storage location for the host overwrite I/O; and
    linking the journal entry corresponding to the host overwrite I/O to a previous journal entry via a CDP link, said previous journal entry corresponding to a previously initiated host write I/O.

8. A method as claimed in claim 7, further comprising:
creating a mapping table entry corresponding to the host overwrite I/O and providing said mapping table entry corresponding to the host overwrite I/O to the mapping table;
removing a previous mapping table entry from the mapping table, said previous mapping table entry corresponding to the previously initiated host write I/O; and
executing the host overwrite I/O to the allocated storage location.

9. A method as claimed in claim 8, further comprising:
when execution of the host overwrite I/O is completed, clearing the in-flight write log entry from the in-flight write log and providing a response to the host signaling that execution of the host overwrite I/O is completed.

10. A method as claimed in claim 8, further comprising:
when an instance failure occurs during execution of the host overwrite I/O and when a host read I/O is subsequently initiated against the data block after instance recovery, locating in the mapping table said mapping table entry corresponding to the host overwrite I/O.

11. A method as claimed in claim 10, further comprising:
locating the journal entry corresponding to the host overwrite I/O;
checking the in-flight write log to determine if said in-flight write log includes an in-flight write log timestamp that matches the journal entry timestamp corresponding to the host overwrite I/O;
when the in-flight write log includes an in-flight write log timestamp that matches the journal entry timestamp corresponding to the host overwrite I/O, accessing said previous journal entry corresponding to said previously initiated host write I/O via said CDP link;
restoring said previous mapping table entry corresponding to the previously initiated host write I/O to said mapping table;
removing said mapping table entry corresponding to the host overwrite I/O from the mapping table;
clearing the in-flight write log entry and the in-flight write log timestamp from the in-flight write log;
executing the host read I/O; and
when execution of the host read I/O is completed, providing a response to the host signaling that execution of the host read I/O is completed.

* * * * *